United States Patent
Iwabuchi

(10) Patent No.: US 6,623,661 B2
(45) Date of Patent: Sep. 23, 2003

(54) METHOD FOR PRODUCING PHOTOSTIMULABLE PHOSPHOR

(75) Inventor: Yasuo Iwabuchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 59 days.

(21) Appl. No.: 10/052,367

(22) Filed: Jan. 23, 2002

(65) Prior Publication Data

US 2002/0134968 A1 Sep. 26, 2002

(30) Foreign Application Priority Data

Jan. 23, 2001 (JP) ................................ 2001-014121

(51) Int. Cl.$^7$ .......................... C09K 11/61; C09K 11/55
(52) U.S. Cl. .................................... 252/301.4 H
(58) Field of Search .................... 252/301.4 H, 301.4 R

(56) References Cited

U.S. PATENT DOCUMENTS 5,380,599 A * 1/1995 Brixner et al. .............. 428/691
6,444,142 B1 * 9/2002 Matsumoto et al. . 252/301.4 H

FOREIGN PATENT DOCUMENTS

EP 0712917 A2 5/1996

* cited by examiner

*Primary Examiner*—C. Melissa Koslow
(74) *Attorney, Agent, or Firm*—Sughrue Mion, PLLC

(57) ABSTRACT

The present invention provides a method for producing a rare earth activated, alkaline earth metal fluorohalide photostimulable phosphor which is expressed by a basic composition formula $(Ba_{1-a}M^{II}{}_a)F(Br_{1-b}I_b):zLn$, the method comprising the steps of: calcining a precursor of the rare earth activated, alkaline earth metal fluorohalide photostimulable phosphor to obtain a calcined product; and annealing the calcined product so that the following annealing conditions are met: (1) $T_{mp}-600°\,C. \leq Ta \leq T_{mp}-300°\,C.$, wherein Ta is the annealing temperature (° C.), and $T_{mp}$ is the melting point (° C.) of a host crystal; and (2) $10^{-5} \leq N \times ta \leq 1$, wherein ta is the processing time (in minutes), and N is the number of oxygen moles/the number of phosphor moles.

6 Claims, No Drawings

METHOD FOR PRODUCING PHOTOSTIMULABLE PHOSPHOR

BACKGROUND OF THE INVENTION

1. Field of the Invention

The present invention relates to a method for producing a photostimulable phosphor used in a radiological image conversion panel. Specifically, the present invention relates to a method for producing a rare earth activated, alkaline earth metal fluorohalide photostimulable phosphor which is expressed by a basic composition formula $(Ba_{1-a}M^{II}{}_a)F(Br_{1-b}I_b):zLn$.

2. Description of the Related Art

A radiological image recording and reproducing method which uses a photostimulable phosphor has been known as a method which can be used in place of a conventional radiography. This method uses a radiological image conversion panel containing a photostimulable phosphor (storable phosphor sheet). In this method, a photostimulable phosphor of a radiological image conversion panel absorbs radiation which has passed through a subject or been emitted from an object to be examined. Thereafter, the photostimulable phosphor is time serially excited by electromagnetic waves (excitation light) such as visible light rays or infrared rays, thereby allowing the radiation energy stored in the photostimulable phosphor to be released as fluorescence (stimulated emissions). An electric signal is obtained by photoelectrically reading the fluorescence, and the radiological image of the subject or the object to be examined is produced as a visible image based on the obtained electric signal. After the image, which was read but remains on the image conversion panel, is erased, the radiological image conversion panel is prepared for the next projection. Namely, the radiological image conversion panel can be used repeatedly.

As compared to a conventional radiography method using radiographic film in combination with an intensifying screen, the above radiographic recording and reproduction method has the advantage of being able to provide radiological images having ample amounts of information while receiving much less exposure to radiation. Further, in conventional radiography, the radiographic film is consumed each time projection is carried out. In contrast, since the radiological image conversion panel can be repeatedly used in the radiological image conversion recording and reproducing method, it is beneficial from the view points of conservation of resources and economic efficiency.

The photostimulable phosphor is a phosphor which generates stimulated emissions when irradiated with excitation light subsequent to being irradiated with radiation. In practice, a phosphor which generates stimulated emissions in a wavelength range of 300 to 500 nm by irradiating an excitation light in a wavelength range of 400 to 900 nm is generally used. An example of a photostimulable phosphor which has been conventionally used in the radiological image conversion panel is a rare earth activated, alkaline earth metal fluorohalide phosphor.

The rare earth activated, alkaline earth metal fluorohalide phosphor is generally produced by the following method. First, a mixture of phosphor raw materials (a phosphor precursor) is produced by a dry process in which the phosphor raw materials are uniformly mixed in a dry state, or a wet process in which the phosphor raw materials are uniformly mixed together in a slurry state and then dried. Next, the obtained mixture of the phosphor raw materials (the phosphor precursor) is calcined ordinarily at a temperature near a melting point of a host crystal (Ba, FX, and the like) in a neutral or weak oxidizing atmosphere at substantially atmospheric pressure for several hours (calcination process). The obtained calcined product may be re-calcined if desired. The calcination process allows growth of the host crystal of the phosphor, and at the same time, diffuses activator elements (Eu and the like) in the host crystal. Further, an $F^+$-halogen center which serves as a central source of photostimulation is also generated. Accordingly, the calcination process is an important process which influences the light emission characteristics of the phosphor. After the calcination process, the obtained phosphor is subjected to washing, classification, and the like, as necessary.

The rare earth activated, alkaline earth metal fluorohalide phosphor is generally produced as described above. However, various characteristics, for example, sensitivity and erasability, of the rare earth activated, alkaline earth metal fluorohalide phosphor change greatly depending on the production method used. Various approaches have been made in order to solve this problem. Japanese Patent Application Laid-Open (JP-A) No. 8-231952 discloses one approach, which is to improve erasability of the rare earth activated, alkaline earth metal fluorohalide phosphor by annealing at a temperature lower than the calcination temperature (700° C. to the melting point) and in the range of 400° C. to 800° C. (preferably 500° C. to 750° C).

In practice, however, the processing temperature preferable for a phosphor varies according to the composition (such as iodine content) of the phosphor. For example, the higher the iodine content, the lower the optimum processing temperature. More specifically, for example, when a BaFBrI:Eu phosphor precursor containing 50% of iodine is subjected to annealing (a heat treatment) at a temperature of 650° C. or higher after calcination, a problem arises in that sensitivity greatly deteriorates. Moreover, various characteristics including sensitivity and erasability are greatly influenced not only by the annealing temperature and the concentration of oxygen but also by the amount of the phosphor to be processed and processing time. However, the relationship between these factors and the characteristics of the phosphor has been unclear.

SUMMARY OF THE INVENTION

Accordingly, an object of the present invention is to solve the conventional problems, namely, to provide a method for producing a photostimulable phosphor, by which method sensitivity and erasability can be obtained at a practical level, and improvements in image quality and a high throughput system can be realized.

The above object is achieved by the following means. The present invention provides a method for producing a rare earth activated, alkaline earth metal fluorohalide photostimulable phosphor which is expressed by a basic composition formula $(Ba_{1-a}M^{II}{}_a)F(Br_{1-b}I_b):zLn$, wherein $M^{II}$ is at least one alkaline earth metal selected from a group consisting of Sr and Ca; Ln is at least one rare earth element selected from a group consisting of Ce, Pr, Sm, Eu, Tb, Dy, Ho, Nd, Er, Tm, and Yb; and a, b, and z are numerical values of ranges $0 \leq a < 1$, $0 \leq b \leq 1$, and $0 < z \leq 0.2$, respectively, the method comprising the steps of: calcining a precursor of the rare earth activated, alkaline earth metal fluorohalide photostimulable phosphor to obtain a calcined product; and annealing the calcined product so that the following annealing conditions are met: (1) $T_{mp} - 600°$ C. $\leq Ta \leq T_{mp} - 300°$ C., wherein Ta is the annealing temperature (° C.), and $T_{mp}$ is the melting point (° C.) of a host crystal; and (2) $10^{-5} \leq N \times ta \leq 1$, wherein ta is the processing time (in minutes), and N is the number of oxygen moles/the number of phosphor moles.

DESCRIPTION OF THE PREFERRED EMBODIMENTS

The method for producing a photostimulable phosphor according to the present invention is characterized in that a precursor of a rare earth activated, alkaline earth metal fluorohalide photostimulable phosphor, which is expressed by a given basic composition formula $(Ba_{1-a}M^{II}{}_a)F(Br_{1-b}I_b):zLn$ to be described later, is calcined and then annealed so that particular annealing conditions which will be described later are met.

In the method for producing a photostimulable phosphor according to the present invention, a photostimulable phosphor precursor is subjected to annealing (heat treatment) after calcination, so that particular annealing conditions are met, namely, a relationship between annealing temperature and a melting point of a host crystal, and a relationship between processing time and the numbers of oxygen moles and phosphor moles fall within predetermined ranges. As a result, a practical level of both sensitivity and erasability at can be obtained without deterioration. Further, improvements in image quality and a high throughput system can be realized.

In this method, the precursor of the rare earth activated, alkaline earth metal fluorohalide photostimulable phosphor expressed by the given basic composition formula $(Ba_{1-a}M^{II}{}_a)F(Br_{1-b}I_b):zLn$, is used as a phosphor precursor. In the formula, $M^{II}$ is at least one alkaline earth metal selected from a group consisting of Sr and Ca; Ln is at least one rare earth element selected from a group consisting of Ce, Pr, Sm, Eu, Tb, Dy, Ho, Nd, Er, Tm, and Yb; and a, b, and z are numerical values of the ranges $0 \leq a < 1$, $0 \leq b \leq 1$, and $0 < z \leq 0.2$, respectively.

The phosphor precursor can be produced by mixing stoichiometrically appropriate amounts of raw materials (components). The phosphor precursor can be produced by any ordinary method, for example, by pulverizing respective raw materials in a mortar and mixing them. However, materials are preferably mixed in the form of a solution or a suspension including distilled water. Although the raw materials can be obtained by well-known powder-making methods, some are commercially available.

For example, the raw materials can be mixed in the form of a solution or a suspension including distilled water in the following manner. The raw materials are dissolved in an ordinary solvent and then stirred until the phosphor precursor is created by a maturing/precipitation reaction. The phosphor precursor can be a mixture of starting components depending on reaction conditions and can be, for example, a host lattice having Eu in a +3 oxidation state. In this case, calcination changes the Eu to a +2 oxidation state. An advantage of the solution/suspension method is that the raw materials are completely mixed in the mixture. After the solution or suspension of the raw materials has been produced, the distilled water is removed to obtain a phosphor precursor in the form of dry cake. Distilled water is preferably removed from the solution or suspension at an appropriate temperature, namely, from room temperature to 200° C. Water included in the suspension can be removed by using any method including drying by heating, vacuum drying or drying under reduced pressure, spray drying, or drying using a high-frequency electronic oven. In drying using a high-frequency electronic oven, a high-frequency electronic oven is preferably controlled so that water is removed at an appropriate speed and the temperature of the phosphor precursor is maintained relatively constant. Further, variation of temperature is preferably minimized by periodically or continuously rotating a table included in the oven when necessary. This process continues until the materials become dry (in the form of a white cake). A different kind of phosphor can also be produced by using other drying operations and modifications of the drying operations. The dry cake thus obtained may be pulverized in a mortar or the like and used as a phosphor precursor.

In the method for producing a photostimulable phosphor according to the present invention, after the phosphor precursor has been produced as described above, the phosphor precursor is calcined. From the standpoints of preventing deterioration of various characteristics such as sensitivity and erasability, calcination is preferably carried out so as to meet the following calcination conditions (3) and (4). Calcination is generally carried out such that a phosphor precursor is placed in a heat resistant container such as a boat-shaped crystal container, an alumina crucible, or a crystal crucible.

Calcination condition (3): $T_{mp}-300° C. \leq Tb \leq T_{mp}-20° C.$ (wherein Tb is the calcination temperature (° C.), and $T_{mp}$ is the melting point of the host crystal (° C.))

Calcination condition (4): $30 \leq tb \leq 720$ (wherein tb is the processing time (in minutes))

In the method for producing a photostimulable phosphor according to the present invention, as described in the calcination condition (3), calcination is preferably carried out such that the calcination temperature Tb (° C.) is from (the melting point $T_{mp}$ of the host crystal $-300°$ C.) to (the melting point $T_{mp}$ of the host crystal $-20°$ C.), and more preferably from (the melting point $T_{mp}$ of the host crystal $-250°$ C.) to (the melting point $T_{mp}$ of the host crystal $-100°$ C.). If the calcination temperature Tb (° C.) is less than the melting point $T_{mp}$ of the host crystal $-300°$ C., activation of Eu and generation of defects in Br may become insufficient, thereby resulting in a decrease in sensitivity. If the calcination temperature exceeds $T_{mp}-20°$ C., fine particles may be sintered or melted together, thereby deteriorating both sensitivity and erasability. The melting point (° C.) of the host crystal described herein is the same as that in annealing condition (1), which will be described later.

In the method for producing a photostimulable phosphor according to the present invention, as described in the calcination condition (4), calcination is preferably carried out with the processing time tb (in minutes) being 30 to 720 minutes, and more preferably 60 to 360 minutes. If the processing time tb is less than 30 minutes, activation of Eu and the generation of defects in Br become insufficient, resulting in a decrease in sensitivity. If the processing time tb exceeds 720 minutes, no difference can be seen from light emission characteristics already obtained.

The atmosphere in which calcination is carried out is not particularly limited, and the photostimulable phosphor can be calcinated in, for example, an inert gas atmosphere. The "inert gas" mentioned herein refers to noble gases such as helium, neon, and argon, and functionally inert gases such as nitrogen. Oxygen may be mixed with an inert gas. The photostimulable phosphor can also be calcined in a reactive gas atmosphere. Specifically, when, for example, an organic compound or ion is present in the phosphor precursor, the phosphor precursor can be calcined using carbon dioxide gas as a reactive gas in order to promote volatilization of remaining carbon. However, an excessively reactant gas atmosphere, in which a generated phosphor cannot be used or various characteristics of the phosphor deteriorate, is not desirable.

Heating and cooling gradients for calcination can be appropriately selected in accordance with decomposition requirements for the phosphor precursor. Annealing can be performed immediately after calcination without a cooling step. Alternatively, annealing can be performed after a calcined product has been cooled.

In the photostimulable phosphor producing method according to the present invention, the phosphor precursor is annealed after calcination as described above. Annealing is carried out so as to simultaneously meet the following annealing conditions (1) and (2).

Annealing condition (1): $T_{mp}-600°$ C.$\leq$Ta$\leq T_{mp}-300°$ C. (wherein Ta is the annealing temperature (° C.), and $T_{mp}$ is the melting point (° C.) of the host crystal)

Annealing condition (2): $10^{-5} \leq N \times ta \leq 1$ (wherein ta is the processing time (in minutes), and N is the number of oxygen moles/the number of phosphor moles)

In the method of the present invention, as indicated by the annealing condition (1), annealing is carried out so that the annealing temperature (° C.) is from (the melting point $T_{mp}$ of the host crystal −600° C.) to (the melting point $T_{mp}$ of the host crystal −300° C.), and preferably from (the melting point $T_{mp}$ of the host crystal −550° C.) to (the melting point $T_{mp}$ of the host crystal −350° C.). If the annealing temperature Ta (° C.) is less than the melting point $T_{mp}$ of the host crystal −600° C., erasability cannot be sufficiently improved. However, if the annealing temperature Ta (° C.) exceeds the melting point $T_{mp}$ of the host crystal −300° C., the process causes significant deterioration in sensitivity.

In this case, the melting point (° C.) of the host crystal refers to the melting point of the phosphor (precursor) obtained after calcination. The melting point can be measured using the following method, in which a differential thermal measuring device (TG/DTA 320, manufactured by Seiko Instruments Inc.) is used.

About 20 g of a sample is placed into a platinum holder and heated at a temperature gradient of 40° C./min. Then, the melting point can be determined by using a DTA (differential thermal) curve thus obtained. The melting point (° C.) of the host crystal varies according to the composition of the phosphor, for example, the iodine content.

In the method of the present invention, as indicated in the annealing condition (2), annealing is carried out so that the product of the processing time ta (in minutes) and the number of oxygen moles/the number of phosphor moles N (namely, the number of oxygen moles in an atmosphere relative to one phosphor mole, and simply referred to as "the number of oxygen moles N" on occasion) is from $10^{-5}$ to 1, and preferably from $10^{-4}$ to 0.1. If the product is less than $10^{-5}$, erasability cannot be sufficiently improved. If the product exceeds 1, the process causes significant deterioration in sensitivity.

In order to meet the annealing conditions, annealing is carried out in an atmosphere whose amount of oxygen has been adjusted. Annealing can be performed in, for example, an inert gas atmosphere with which oxygen is mixed. The inert gas used herein is similar to the inert gases described above. Further, heating and cooling gradients for calcination can be appropriately selected in accordance with decomposition requirements for the phosphor precursor.

The photostimulable phosphor obtained by the production method of the present invention can be used in radiological image conversion panels. In general, the phosphor generated after the above-described annealing is pulverized into particles having a predetermined diameter. Additional processings (for example, washing, drying, and sieving) which are well known in the art may be performed so that the phosphor is adapted for a predetermined purpose. The median size of the particle used is generally about 0.5 to 40 μm. The particles having a median size of 1 to 20 μm are preferable because they facilitate blending and optimize panel characteristics such as speed, sharpness, and noise.

A radiological image conversion panel can be produced by an ordinary coating method in which powders of the photostimulable phosphor obtained as described above are mixed with a solution of a known conventional resin binder material, and the resulting mixture is coated onto a substrate by a coating means such as blade coating. For example, as disclosed in U.S. Pat. No. 4,505,989, the radiological image conversion panel can be preferably produced by using methods which are useful and well known in the art.

EXAMPLES

The present invention will now be described by, but is not limited to, the following Examples.

Measurement of Melting Point of Host Crystal

As described above, the melting points of host crystals in samples which were subjected to calcination (i.e., calcined products) were measured using a differential thermal measuring device (TG/DTA 320, manufactured by Seiko Instruments Inc.). As a result, the melting point of a BaFBrI:Eu phosphor (calcined product) composed of 15% iodine was 973° C., the melting point of a BaFBrI:Eu (calcined product) composed of 30% iodine was 923° C., and the melting point of a BaFBrI:Eu phosphor (calcined product) composed of 50% iodine was 900° C.

Example 1

200.8 g of BaFBr:Eu and 42.5 g of BaFI:Eu were respectively weighed out and mixed together by a mixer to obtain a phosphor precursor. The obtained phosphor precursor was calcined in a tube furnace at 800° C. (calcination temperature Tb) for two hours (processing time tb) in an $N_2$ atmosphere to obtain a calcined product of $BaFBr_{0.85}I_{0.15}$:Eu composed of 15% iodine. The calcined product was annealed (heat-treated) at 500° C. (annealing temperature Ta) for 30 minutes (processing time ta) in a mixed atmosphere of oxygen and nitrogen (the amount of oxygen with respect to nitrogen: 0.1%) to obtain the phosphor of Example 1. The annealing temperature Ta was lower than the melting point of the host crystal by 473° C. The number of oxygen moles N in the atmosphere relative to one phosphor mole was 1.6E−4(1.6×10$^{-4}$), and the product of the number of oxygen moles N and the processing time ta (30 minutes) was 4.7E−3(4.7×10$^{-3}$).

Examples 2–6

In accordance with Table 1, phosphors of Examples 2–6 were obtained in the same manner as in Example 1, except that the mixing ratios of the respective raw materials were changed to make phosphor precursors with differenc iodine contents, and the annealing temperature Ta, the number of oxygen moles N and the processing times ta were changed to perform the annealing. Respective calcination conditions and annealing conditions are given in Table 1.

Comparative Examples 1–6

In accordance with Table 1, phosphors of Comparative Examples 1–6 were obtained in the same manner as in Example 1, except that the mixing ratios of the respective raw materials were changed to make phosphor precursors with differenc iodine contents, and the annealing temperature Ta, the number of oxygen moles N and the processing times ta were changed to perform the annealing. In Comparative Examples 1–6, the annealing condition (1) was not met. Respective calcination conditions and annealing conditions are given in Table 1.

Examples 7–12

In accordance with Table 2, phosphors of Examples 7–12 were obtained in the same manner as in Example 1, except that the phosphor precursors (raw materials) were made so as to have an iodine content of 15%, and the annealing temperature Ta, the number of oxygen moles N and the processing times ta were changed to perform the annealing. Respective calcination conditions and annealing conditions are given in Table 2.

Comparative Examples 7 and 8

In accordance with Table 2, phosphors of Comparative Examples 7 and 8 were obtained in the same manner as in Example 1, except that the phosphor precursors (raw materials) were made so as to have an iodine content of 15%, and the annealing temperature Ta, the number of oxygen moles N and the processing times ta were changed to perform the annealing. In Comparative Examples 7 and 8, the annealing condition (2) was not met. The respective annealing conditions are given in Table 2.

Comparative Examples 9 and 10

In accordance with Table 2, phosphors of Examples 9 and 10 were obtained in the same manner as in Example 1, except that the phosphor precursors (raw materials) were made so as to have an iodine content of 15%, and the annealing temperature Ta, the number of oxygen moles N and the processing times ta were changed to perform the annealing. In Comparative Examples 9 and 10, neither the calcination conditions nor the annealing conditions was met. Respective calcination conditions and annealing conditions are given in Table 2.

Evaluation

Sensitivity and erasure values of the phosphors thus obtained were examined as follows. Evaluation results are given in Tables 1 and 2.

[Sensitivity]

200 mg of phosphor particles were uniformly loaded into a black cylindrical holder. (The diameter of the opening of the holder was 10 mm, and the depth was 1 mm.) In a dark room, the surface of the phosphor at the opening of the holder was irradiated with X-rays having tube voltage of 80 kVp at 100 mR that had passed through an Al filter having a thickness of 3 mm by an X-ray generator (MG 164, manufactured by Koninklijke Philips Electronics N.V.). Twenty seconds later, the surface of the phosphor was uniformly irradiated with a semiconductor laser beam (ML-1016R, produced by Mitsubishi Electric Corp.) having a wavelength of 660 nm and an excitation energy of 4.3 J/m$^2$. At this time, stimulated emission light radiated from the surface of the phosphor was received by a photomultiplier tube (R-1848, manufactured by Hamamatsu Photonics K.K.) that had passed through an optical filter (B-410, produced by Hoya Corp.), and the amount of stimulated emission was measured. The measured values are expressed as values relative to the measured values of the phosphors in Comparative Examples being 100.

[Erasure Value]

200 mg of phosphor particles were uniformly loaded into a black cylindrical holder. (The diameter of the opening of the holder was 10 mm, and the depth was 1 mm.) In a dark room, the surface of the phosphor at the opening of the holder was irradiated with X-rays having tube voltage of 80 kVp at 100 mR that had passed through an Al filter having a thickness of 3 mm by the X-ray generator (MG 164). Twenty seconds later, the surface of the phosphor was uniformly irradiated with the semiconductor laser beam (ML-1016R) having a wavelength of 660 nm and an excitation energy of 4.3 J/m$^2$. At this time, stimulated emission light radiated from the surface of the phosphor was received by the photomultiplier tube (R-1848) that had passed through the optical filter (B-410), and a stimulated emission (initial) amount was measured. Subsequently, the phosphor was subjected to an erasure process in the following manner. The phosphor was irradiated with light having a luminous intensity of 300000 lx·second by using a three band colored fluorescent lamp (FLR505T5EX-L, produced by Prince Electric Co., Ltd.). The phosphor was then irradiated with light having a luminous intensity of 200000 lx·second (500000 lx·second in total) that had passed through a sharp cut filter (N-039, produced by Nitto Jushi Co., Ltd.) which blocks light having a wavelength shorter than 480 nm, and information remained in the phosphor was then erased. The phosphor was irradiated with a semiconductor laser beam under the same conditions, and a stimulated emission amount (after erasure) was measured. The value obtained by standardizing the stimulated emission amount after erasure with the initial stimulated emission amount is represented by the erasure value.

TABLE 1

| | | | | Calcination conditions | | Annealing conditions | | | | | |
|---|---|---|---|---|---|---|---|---|---|---|---|
| | BaFBr:Eu (g) | BaFl:Eu (g) | Iodine content (%) | Melting point $T_{mp}$ of host crystal (° C.) | Calcination temperature Tb (° C.) | Processing time tb (min) | Annealing temperature Ta (° C.) | Amount of oxygen (%) | Processing time tb (min) | Number of oxygen moles N × processing time ta | Sensitivity | Erasure value |
| Example 1 | 200.8 | 42.5 | 15 | 973 | 800 | 120 | 500 | 0.1 | 30 | 4.7E−3 | 60 | 1.1E−05 |
| Example 2 | 200.8 | 42.5 | 15 | 973 | 800 | 120 | 650 | 0.1 | 30 | 4.0E−3 | 42 | 1.0E−05 |
| Example 3 | 165.4 | 85.0 | 30 | 923 | 800 | 120 | 450 | 0.01 | 120 | 2.0E−3 | 57 | 6.2E−06 |
| Example 4 | 165.4 | 85.0 | 30 | 923 | 800 | 120 | 600 | 0.01 | 120 | 1.7E−3 | 45 | 1.5E−05 |
| Example 5 | 118.1 | 141.6 | 50 | 900 | 800 | 120 | 450 | 0.01 | 90 | 1.5E−3 | 78 | 1.0E−05 |

TABLE 1-continued

| | BaFBr:Eu (g) | BaFl:Eu (g) | Iodine content (%) | Melting point $T_{mp}$ of host crystal (° C.) | Calcination conditions | | Annealing conditions | | | | | |
|---|---|---|---|---|---|---|---|---|---|---|---|---|
| | | | | | Calcination temperature Tb (° C.) | Processing time tb (min) | Annealing temperature Ta (° C.) | Amount of oxygen (%) | Processing time tb (min) | Number of oxygen moles N × processing time ta | Sensitivity | Erasure value |
| Example 6 | 118.1 | 141.6 | 50 | 900 | 800 | 120 | 550 | 0.01 | 120 | 1.8E−3 | 72 | 1.9E−05 |
| Comparative Example 1 | 200.8 | 42.5 | 15 | 973 | 800 | 120 | 300 | 0.1 | 30 | 6.4E−3 | 80 | 1.9E−04 |
| Comparative Example 2 | 200.8 | 42.5 | 15 | 973 | 800 | 120 | 700 | 0.1 | 60 | 7.5E−3 | 23 | 7.4E−06 |
| Comparative Example 3 | 165.4 | 85.0 | 30 | 923 | 800 | 120 | 300 | 0.01 | 60 | 1.3E−3 | 85 | 5.0E−05 |
| Comparative Example 4 | 165.4 | 85.0 | 30 | 923 | 800 | 120 | 650 | 0.01 | 60 | 7.9E−4 | 30 | 1.5E−05 |
| Comparative Example 5 | 118.1 | 141.6 | 50 | 900 | 800 | 120 | 200 | 0.01 | 120 | 3.1E−3 | 103 | 8.9E−04 |
| Comparative Example 6 | 118.1 | 141.6 | 50 | 900 | 800 | 120 | 650 | 0.01 | 120 | 1.6E−3 | 35 | 5.1E−05 |

TABLE 2

| | BaFBr:Eu (g) | BaFl:Eu (g) | Iodine content (%) | Melting point $T_{mp}$ of host crystal (° C.) | Calcination conditions | | Annealing conditions | | | | | |
|---|---|---|---|---|---|---|---|---|---|---|---|---|
| | | | | | Calcination temperature Tb (° C.) | Processing time tb (min) | Annealing temperature Ta (° C.) | Amount of oxygen (%) | Processing time tb (min) | Number of oxygen moles N × processing time ta | Sensitivity | Erasure value |
| Example 7 | 200.8 | 42.5 | 15 | 973 | 800 | 120 | 600 | 0.001 | 60 | 8.4E−5 | 77 | 1.8E−05 |
| Example 8 | 200.8 | 42.5 | 15 | 973 | 800 | 120 | 600 | 0.01 | 60 | 8.4E−4 | 71 | 6.4E−06 |
| Example 9 | 200.8 | 42.5 | 15 | 973 | 800 | 120 | 600 | 0.1 | 35 | 4.9E−3 | 60 | 5.4E−06 |
| Example 10 | 200.8 | 42.5 | 15 | 973 | 800 | 120 | 600 | 0.1 | 60 | 8.4E−3 | 71 | 6.9E−06 |
| Example 11 | 200.8 | 42.5 | 15 | 973 | 800 | 120 | 600 | 1 | 35 | 4.9E−2 | 54 | 5.0E−06 |
| Example 12 | 200.8 | 42.5 | 15 | 973 | 800 | 120 | 600 | 1 | 60 | 8.4E−2 | 40 | 3.6E−06 |
| Comparative Example 7 | 200.8 | 42.5 | 15 | 973 | 800 | 120 | 600 | 0.001 | 5 | 7.0E−6 | 78 | 4.5E−05 |
| Comparative Example 8 | 200.8 | 42.5 | 15 | 973 | 800 | 120 | 600 | 0.2 | 60 | 1.7E+0 | 6 | 2.9E−06 |
| Comparative Example 9 | 200.8 | 42.5 | 15 | 973 | 955 | 20 | 300 | 0.001 | 5 | 7.0E−6 | 19 | 8.9E−04 |
| Comparative Example 10 | 200.8 | 42.5 | 15 | 973 | 500 | 800 | 300 | 0.001 | 5 | 7.0E−6 | 1 | 6.7E−04 |

From the results of Tables 1 and 2, it can be seen that the annealing conditions vary according to the composition of the phosphor, and that a phosphor having both excellent sensitivity and an excellent erasure value (erasability) can be obtained by annealing the phosphor such that the temperature, the amount of oxygen, and the processing time meet both annealing conditions (1) and (2).

What is claimed is:

1. A method for producing a rare earth activated, alkaline earth metal fluorohalide photostimulable phosphor which is expressed by a basic composition formula $(Ba_{1-a}M^{II}_a)F(Br_{1-b}I_b):zLn$, wherein $M^{II}$ is at least one alkaline earth metal selected from a group consisting of Sr and Ca; Ln is at least one rare earth element selected from a group consisting of Ce, Pr, Sm, Eu, Tb, Dy, Ho, Nd, Er, Tm, and Yb; and a, b, and z are numerical values of ranges $0 \leq a < 1$, $0 \leq b \leq 1$, and $0 < z \leq 0.2$, respectively, the method comprising the steps of:

calcining a precursor of the rare earth activated, alkaline earth metal fluorohalide photostimulable phosphor to obtain a calcined product; and annealing the calcined product so that the following annealing conditions are met: (1) $T_{mp}-600°$ C. $\leq Ta \leq T_{mp}-300°$ C., wherein Ta is the annealing temperature (° C.), and $T_{mp}$ is the melting point (° C.) of a host crystal; and (2) $10^{-5} \leq N \times ta \leq 1$, wherein ta is the processing time (in minutes), and N is the number of oxygen moles/the number of phosphor moles.

2. The method of claim 1, wherein the phosphor precursor is calcined so that the following calcination conditions are met: (3) $T_{mp}-300°$ C. $\leq Tb \leq T_{mp}-20°$ C., wherein Tb is the calcination temperature (° C.), and $T_{mp}$ is the melting point of the host crystal (° C.); and (4) $30 \leq tb \leq 720$, wherein tb is the processing time (in minutes).

3. The method of claim 1, wherein Ta is from $T_{mp}-550°$ C. to $T_{mp}-350°$ C.

4. The method of claim 1, wherein N×ta is from $10^{-4}$ to 0.1.

5. The method of claim 1, wherein Tb is from $T_{mp}-250°$ C. to $T_{mp}-100°$ C.

6. The method of claim 1, wherein tb is from 60 to 360.

* * * * *